2,796,300
FLUID PRESSURE BRAKE APPARATUS

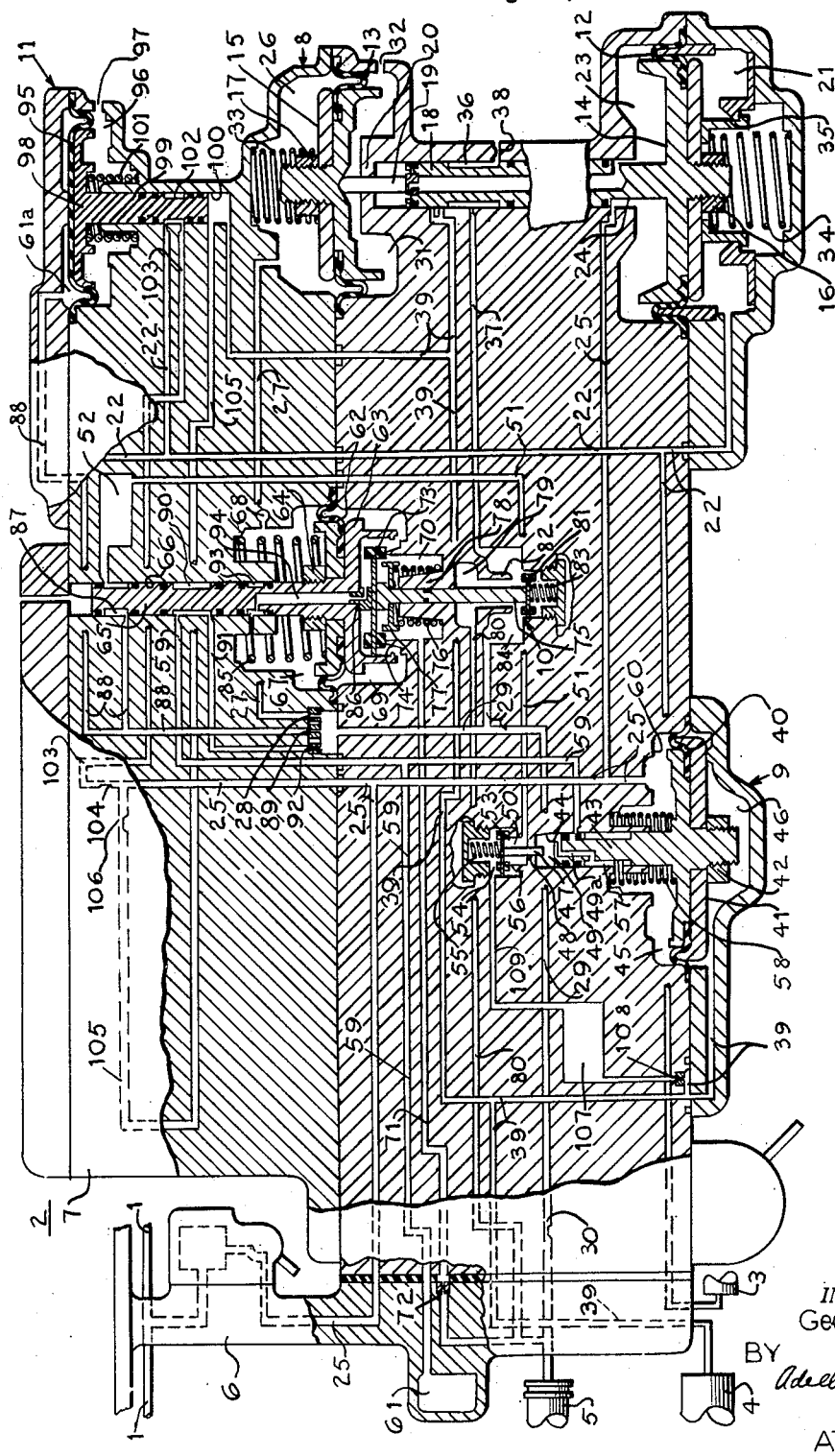
June 18, 1957     G. L. COTTER     2,796,300
FLUID PRESSURE BRAKE APPARATUS
Filed Aug. 24, 1954
INVENTOR.
George L. Cotter
BY
ATTORNEY United States Patent Office 2,796,300
Patented June 18, 1957

George L. Cotter, Pittsburgh, Pa., assignor to Westinghouse Air Brake Company, Wilmerding, Pa., a corporation of Pennsylvania Application August 24, 1954, Serial No. 451,778

7 Claims. (Cl. 303—35)

This invention relates to fluid pressure brake apparatus and more particularly to the type in which the degree of brake application and release is controlled according to the extent of reduction and restoration, respectively, in pressure of fluid in a brake pipe relative to a datum pressure in a control reservoir.

Apparatus of the above type may include, on each brake-equipped car, a quick service valve device comprising a flexible diaphragm subject on opposite sides to pressures of fluid in the brake pipe and in an auxiliary reservoir, which diaphragm controls movement of a slide valve that under a certain condition is adapted, successively, to operatively engage and then unseat a check valve against opposition of auxiliary reservoir pressure and a spring acting on said check valve. This diaphragm is biased to a normal position, but is adapted in response to a slight reduction in brake pipe pressure below auxiliary reservoir pressure to move, in two successive stages, to a quick service position. During the first such stage, the quick service valve diaphragm will deflect and shift the slide valve a certain distance to connect the brake pipe to a quick service volume (which is then open to atmosphere through a choke) for initiating a further, local reduction in brake pipe pressure at the corresponding car so as to not only assure propagation of a wave of pressure reduction rearward through the brake pipe on intervening cars without brake apparatus, to the next brake-equipped car to the rear in the train, in the well-known manner, but also assure a reduction in brake pipe pressure sufficient to cause operation of a service valve device on said corresponding car for supplying fluid under pressure from the auxiliary reservoir to a corresponding brake cylinder device for applying brakes; and during the second stage, which will commence when brake pipe pressure has been thus reduced sufficiently to cause the diaphragm to deflect further for unseating the check valve through the medium of the slide valve, brake pipe pressure will continue to be released by way of the slide valve and, in addition, fluid under pressure from the auxiliary reservoir will be supplied past the unseated check valve to a corresponding timing volume and to a charging valve device for causing operation of the latter device from a charging position to a cut-off position for disconnecting the brake pipe from the control reservoir and auxiliary reservoir, and thereby preventing back flow of fluid under pressure from said reservoirs to the brake pipe.

Since brake apparatus of this general type is used in Europe, where it is customary to vary the percentage of brake-equipped cars in a train according to the intended speed and the type of service of the train, it will be noted that as such percentage is reduced, each quick service valve device will have to effect a reduction in pressure in a correspondingly greater volume of the brake pipe, with the result that the rate of quick service reduction in the brake pipe will be correspondingly reduced due to the fixed sizes of the aforementioned choke and quick service volume. Thus, there is a possibility that in a train having a low percentage of brake-equipped cars, the rate of quick service reduction in the brake pipe may be so slow, in relation to the rate of decrease in auxiliary reservoir pressure caused by previously described flow to the timing volume and charging valve device and to the brake cylinder device, as to cause the diaphragm to deflect toward or to normal position and thus so shift the slide valve as to permit seating of the check valve before sufficient fluid under pressure has been supplied from the auxiliary reservoir to the charging valve device to cause operation of the latter to cut-off position; and under this condition, fluid under pressure will flow from the control reservoir and auxiliary reservoir to the brake pipe, with the result that the pressure obtained in the brake cylinder device will be less than that called for by the chosen degree of brake pipe reduction, which is, of course, undesirable.

The principal object of this invention is therefore to provide an improved brake apparatus of the above type embodying novel means for insuring that, upon the initiation of a brake application, the quick service valve device will move to and remain in quick service position for a period of time sufficient to cause operation of the charging valve device for cutting off fluid pressure communication of the brake pipe with the control reservoir and auxiliary reservoir, even when such apparatus is employed in a train having a low percentage of brake-equipped cars.

According to this object, novel means are provided comprising a volume which is charged at a restricted rate from a source of fluid under pressure, such as the auxiliary reservoir, and is adapted, when the quick service diaphragm moves to quick service position and effects unseating of the check valve, to provide sufficient fluid under pressure to the timing volume and charging valve device for causing operation of the latter device to cut-off position, without effecting appreciable depletion in the auxiliary reservoir pressure acting on one side of said diaphragm.

Other objects and advantages will become apparent from the following more detailed description of the invention and from the accompanying drawing, wherein the single figure is a diagrammatic view of a portion of a brake apparatus embodying the invention.

Description

Since the improved brake apparatus may be generally similar in structure and operation with the type shown and described in the copending application of Earle S. Cook, Serial No. 390,387, filed November 5, 1953, and assigned to the assignee of the present application, the disclosure in the accompanying drawing and in the following description has been limited to such structural and operational characteristics as are deemed essential to a clear understanding of the invention and/or which differ from the precise structure shown in said application.

As shown in the drawing, the improved brake apparatus comprises the usual brake pipe 1, which is adapted to extend through the train and in which the pressure of fluid is adapted to be varied in the well-known manner by manual operation of the usual engineer's automatic brake valve device (not shown) provided on the locomotive.

On each brake-equipped car of the train, there is provided a brake controlling valve device 2 which is adapted to respond to a chosen reduction in pressure in the brake pipe 1, relative to that in a control reservoir 3, for supplying fluid at a corresponding pressure from an auxiliary reservoir 4 to a brake cylinder device 5 for thereby effecting a corresponding degree of brake application on said car; said valve device also being adapted to respond to any degree of increase in pressure in said brake pipe relative to that in said control reservoir for releasing fluid under pressure to a proportionate degree from the brake cylinder device 5 and, at some time (not pertinent to the present invention) after said brake cylinder device is devoid of such fluid, opening the auxiliary reservoir 4 and control reservoir 3 to the brake pipe 1 for causing equalization of fluid pressures in said reservoirs with that in the brake pipe, in the usual manner.

The brake controlling valve device 2 comprises a pipe bracket 6, to which the brake pipe 1, control reservoir 3, auxiliary reservoir 4, and brake cylinder device 5 are adapted to be connected; and on one face of said bracket is adapted to be mounted a sectionalized casing 7. Formed within, and in part defined by, the various sections of the casing 7 are a graduated control or service valve device 8, a quick service valve device 9, an inshot valve device 10, and a charging valve device 11.

The service valve device 8 may, for sake of illustration, be of the type fully shown and described in the copending application of Earle S. Cook, Serial No. 439,706, filed June 28, 1954, and assigned to the assignee of the present application; and which service valve device comprises, briefly, a diaphragm stack comprising two co-axially arranged, spaced apart flexible diaphragms 12, 13 which are cooperatively connected to each other through the medium of diaphragm follower assemblages 14, 15, and screw-thread means 16, 17, respectively; and between said follower assemblages are coaxially arranged a cylindrical slide valve 18, preferably formed integrally with the follower assemblage 14, and a pusher stem 19 which at its opposite ends bears against said slide valve and the follower assemblage 15, respectively, and intermediate its ends has sealing, slidably guided engagement within a bore through a casing partition 20. The diaphragm 12 is subject at its under side, as viewed in the drawing, to pressure of fluid in a chamber 21 that is constantly open to the control reservoir 3 by way of a passage 22; and is subject at the opposite side to pressure of fluid in a chamber 23 that, except under a condition not pertinent to the present invention, is open to the brake pipe 1 by way of an elongated annular groove or cavity 24 in the slide valve 18 and a brake pipe passage 25. The diaphragm 13 is subject at its upper side, as viewed in the drawing, to pressure of fluid in a chamber 26 that is constantly open via a passage 27, the usual stabilizing choke 28, a passage 29, and the usual brake cylinder application choke 30 to the brake cylinder device 5; and said diaphragm is subject at the opposite side to atmospheric pressure in a chamber 31 that is open to atmosphere via a casing port 32.

When brake pipe pressure as noted in chamber 23 is substantially equal to control reservoir pressure in chamber 21, the slide valve 18 is adapted to assume a normal or brake release position, in which it is shown in the drawing, due to the action on the diaphragm stack of a helical spring 33 in the chamber 26, which spring causes the follower assemblage 14 to operatively engage, but not compress, a helical spring 34 retained by a yieldable spring support 35 in the chamber 21. With the slide valve 18 in brake release position, an elongated annular cavity 36 formed in said slide valve connects a passage 37, which is constantly open to the brake cylinder device 5, to the usual brake cylinder release choke 38 so that brakes may be released at the rate controlled by said choke. And upon a reduction in brake pipe pressure in passage 25 and hence in chamber 23, the diaphragm stack is adapted to move in the direction of chamber 26 for shifting the slide valve 18 to a brake application position, in which cavity 36 is so disposed as to disconnect the brake cylinder passage 37 from the brake cylinder release choke 38 and to connect said passage 37 to a passage 39, which is constantly open to the auxiliary reservoir 4, so that fluid under pressure from said auxiliary reservoir may flow via passages 39, 37, and 29 and at the rate controlled by the brake cylinder application choke 30, to the brake cylinder device 5 for applying brakes to a degree corresponding to the chosen brake pipe reduction; whereupon the brake cylinder pressure in chamber 26 acting on diaphragm 13 and assisted by action of spring 33 and reduced brake pipe pressure in chamber 23 acting on diaphragm 12 will shift the diaphragm stack against resistance of control reservoir pressure in chamber 21, for moving the slide valve 18 to a lap position in which cavity 36 is out of registry with both the passage 39 and brake cylinder release choke 38 for bottling up fluid in the brake cylinder device 5 at the desired pressure.

The quick service valve device 9 preferably comprises a flexible diaphragm 40 that is suitably clamped between sections of the casing 7 and is operatively connected, through the medium of a diaphragm follower assemblage 41 and screw-threaded means 42, to a cylindrical slide valve 43 which is slidable within a bore 44. The diaphragm 40 is subject, at the side adjacent the slide valve 43, to pressure of fluid in a chamber 45 which is constantly open to the brake pipe 1 by way of a branch of brake pipe passage 25; and said diaphragm is subject at the opposite side to pressure of fluid in a chamber 46 that is constantly open to the auxiliary reservoir 4 by way of a branch of passage 39.

The unattached or free end of the slide valve 43 is adapted to abut one end of a coaxially arranged actuating stem 47 which has slidably guided, sealing engagement with the wall of a bore through a casing partition 48 that separates a chamber 49 from a chamber 50. The chamber 49 is defined, in part, between the base of bore 44 and the adjacent, free end of said slide valve; whereas the chamber 50 is constantly open by way of a passage 51 to a so-called timing volume 52 that is normally vented to atmosphere in the manner hereinafter to be described. The stem 47 at its opposite end is adapted to engage a preferably disc-shaped check valve 53 that controls communication of the chamber 50 with a chamber 54 that is charged with fluid under pressure supplied from the auxiliary reservoir 4 in the manner hereinafter to be described. For normally preventing fluid pressure communication between the chambers 50, 54, a helical bias spring 55 in chamber 54 urges the check valve 53 into engagement with an annular valve seat rib 56 encircling the chamber 50. The chamber 49 is constantly open to the chamber 45 by way of an internal passageway 49a and an annular cavity 57, both of which are formed in the slide valve 43, so that opposing fluid pressures acting on the diaphragm 40 will be effective on equal areas thereof, unaffected by the area of said slide valve.

In operation, when brake pipe pressure in chamber 45 is substantially equal to auxiliary reservoir pressure in chamber 46, a helical bias spring 58 in chamber 45 acting on the follower assemblage 41 will cause the slide valve 43 to assume a normal position, in which it is shown in the drawing. With the slide valve 43 in this position, the check valve 53 will be seated by action of the spring 55; and the cavity 57 will be out of registry with a passage 59, presently to be described.

However, upon a slight reduction, such as .7 p. s. i., in brake pipe pressure in the chamber 45, the diaphragm 40 is adapted to deflect against resistance of spring 58 for shifting the slide valve 43 to a quick service position, defined by engagement of the follower assemblage 41 with a stop surface 60 formed by a part of the casing 7 defining the chamber 45. This movement of the slide valve 43 to quick service position is effected in two successive stages or steps: first, the cavity 57 connects the chamber 45 to the passage 59 for causing fluid under pressure to flow via the brake pipe passage 25, chamber 45, and passage 59 to a so-called quick service volume 61 for locally effecting a further, quick service reduction in the brake pipe; and then, after brake pipe pressure in chamber 45 has thus been reduced to a further degree sufficient to overcome the combined resistance of spring 55 and auxiliary reservoir pressure in chamber 54 acting on the check valve 53, the diaphragm 40 will deflect an additional extent and cause the free end of the slide valve 43 to operatively unseat said check valve through the medium of the stem 47. With the check valve 53 thus unseated, fluid under pressure will flow via chambers 54, 50 and passage 51 to the timing volume 52, and thence, by way of a communication hereinafter to be described, to a pressure chamber 61a of the charging valve device 11 for causing operation of the same to cut off fluid pressure communication of the brake pipe 1 with the control reservoir 3 and auxiliary reservoir 4, in the manner hereinafter to be described.

The inshot valve device 10 preferably comprises a flexible diaphragm 62 clamped adjacent its outer periphery between sections of the casing 7 and operatively connected through the medium of a diaphragm follower assemblage 63 and screw-threaded means 64 to a cylindrical slide valve 65 that is slidable within a coaxially aligned bore 66 in the casing. At the side of the diaphragm 62 adjacent the slide valve 65 is a chamber 67 that is open to atmosphere by way of a vent port 68; and at the opposite side of said diaphragm is a chamber 69 which, under a condition hereinafter to be described, is adapted to be connected to a chamber 70 that, in turn, is open to the brake cylinder device 5 by way of a passage 71 and an inshot baffle or stabilizing choke 72.

For controlling fluid pressure communication between the chambers 69, 70 there is provided a preferably disc-shaped valve 73 which is adapted to seat against an annular valve seat rib 74 formed by a projecting part of the casing encircling the chamber 70. An actuating stem 75 is held in abutting engagement with the lower face, as viewed in the drawing, of the valve 73, through the medium of a helical spring 76, which is disposed in the chamber 70 and acts on an annular spring seat 77 carried by said stem. Intermediate its ends the stem 75 has sealing, slidably guided engagement with the wall of a bore through a casing partition 78 separating the chamber 70 from a chamber 79 that is constantly open to the brake cylinder device 5 by way of a passage 80; and said stem projects into chamber 79 and at its lower end is adapted to engage and unseat a disc-shaped inshot valve 81 from an annular valve seat rib 82 against resistance of a helical bias spring 83 is a chamber 84 that is interposed between the passage 37 and a branch of passage 29; said inshot valve being provided for controlling fluid pressure communication between the chambers 84 and 79.

A helical regulating spring 85 in chamber 67 acts on the follower assemblage 63 for causing a fitting 86 depending from and coaxially secured to said follower assemblage to engage the upper side, as viewed in the drawing, of the valve 73 for normally holding said valve seated and, through the medium of said valve and the stem 75, holding the inshot valve 81 in an open or unseated position, in which it is shown in the drawing. Under this condition, the slide valve 65, being positively connected to the follower assemblage 63, is so disposed that an annular cavity 87 formed in said slide valve connects the timing volume 52 to a passage 88, one branch of which leads to the pressure chamber 61a of the charging valve device 11 and another branch of which is open through a charging valve delay choke 89 to the passage 29 which leads to the brake cylinder device 5; an annular cavity 90 in said slide valve connects a branch of passage 59 to a passage 91 that is open through the usual quick service reduction choke 92 to the passage 29; and an annular cavity 93 in said slide valve connects the chamber 67 with an internal passageway 94 that leads through the slide valve 65, follower assemblage 63 and fitting 86 to the chamber 69 for thereby opening chamber 69 to atmosphere by way of atmospheric chamber 67.

Thus, the inshot valve 81 will be unseated, and the slide valve 65 will establish the connections just described, whenever the valve 73 is seated, as will occur when brake cylinder pressure in chamber 70 is less than a chosen value, such as 10 p. s. i., as determined substantially by the selected value of the regulating spring 85.

With the inshot valve 81 thus unseated fluid under pressure supplied from the auxiliary reservoir 4 via passage 39, service slide valve cavity 36, and passage 37 to the inshot valve chamber 84, will flow past the unseated inshot valve 81 to chamber 79 and thence via the passage 80 to the brake cylinder device 5 for rapidly taking up slack in the brake rigging, in the well-known manner; and some of such fluid will also flow from chamber 84 via branches of the passage 29 through the choke 89 and passage 88 to the charging valve chamber 61a and also to said brake cylinder device at the rate controlled by the application choke 30.

As the pressure in chamber 70 increases by flow in the manner just described, to a value above the aforementioned chosen value, the valve 73 will be unseated against resistance of the spring 85, which acts on said valve through the medium of the follower assemblage 63 and fitting 86; and during this unseating of the valve 73, the stem 75 will move upwardly under action of spring 76 for thereby causing the inshot valve 81 to be moved to a closed position by action of the spring 83. Under this condition, the brake cylinder device will thereafter be charged solely by way of passage 29 at the rate controlled by the application choke 30, and the cavities 87, 90 and 93 of the slide valve 65 will be so disposed as to disestablish the connections previously described, for thereby causing fluid under pressure to be bottled up in the timing volume 52 and quick service volume 61 until the inshot valve 81 moves to open position, during the final phase of a release of brakes, in the manner hereinafter to be explained.

The charging valve device 11 may comprise, briefly, a flexible diaphragm 95 which is suitably clamped about its outer edge between sections of the casing 7 and separates the pressure chamber 61a from a chamber 96 which is open to atmosphere by way of a vent port 97. The diaphragm 95 is operatively connected through the medium of a diaphragm follower 98 to a cylindrical slide valve 99, which preferably is formed integrally with said follower and is slidable within a bore 100 that is open at one end to the chamber 96.

A helical bias spring 101 in chamber 96 acting on the follower 98 urges the slide valve 99 to a charging position, in which it is shown in the drawing, and which position will be assumed when the pressure chamber 61a is substantially devoid of fluid under pressure. In this position, an annular cavity 102 in the slide valve 99 connects a branch of the control reservoir passage 22 to a certain fluid pressure charging communication, which may, for sake of illustration, comprise a passage 103 that is open by way of a choke 104 to a branch of the brake pipe passage 25, for permitting equalization of the pressure in the control reservoir 3 with that in the brake pipe 1 at the rate controlled by said choke; and also the free end of said slide valve uncovers a branch of the auxiliary reservoir passage 39 to another fluid pressure charging communication, which may, for sake of illustration, comprise a passage 105 that is open by way of a choke 106 to another branch of said brake pipe passage, for enabling the auxiliary reservoir 4 to be charged with fluid under pressure from said brake pipe; although, if preferred, said charging communications may be of the type shown and described in the copending application to E. S. Cook first described above.

However, when by previously described flow of fluid under pressure past the unseated check valve 53 and through the inshot valve device 10, the pressure chamber 61a is charged with fluid at a pressure in excess of several p. s. i., the diaphragm 95 will deflect against resistance of the spring 101 for shifting the slide valve 99 to a cut-off position in which the passages 103, 105 are cut off from the passages 22, 39, respectively, for bottling up fluid under pressure in the control reservoir 3 and preventing depletion of auxiliary reservoir pressure into the brake pipe. Since the chamber 61a is open to the brake cylinder passage 29 by way of passage 88 and the charging valve delay choke 89, brake cylinder pressure will maintain said chamber charged after the inshot valve 81 closes and the slide valve 65 disconnects the timing volume 52 from the passage 88, in the manner previously described, during a brake application. Upon a subsequent release of brakes, the pressure chamber 61a will be maintained charged from the brake cylinder passage 29 until brake cylinder pressure is reduced to such a degree as to cause opening of the inshot valve 81; whereupon fluid under pressure hitherto bottled up in the timing volume 52 will be dumped into chamber 61a for delaying movement of the charging slide valve 99 to charging position, for reasons not pertinent to the present invention, until such fluid has been substantially completely released, at the rate controlled by the delay choke 89, into the vented brake cylinder device 5.

With the apparatus as thus far described, when the brake cylinder device 5 is devoid of fluid under pressure, the slide valve 18 of the service valve device 8 will be in brake release position, the slide valve 43 of the quick service valve device 9 will be in normal position, the inshot valve 81 of the device 10 will be in open position, and the slide valve 99 of the charging valve device 11 will be in charging position, as will be understood from previous description. Upon a reduction in pressure, in excess of the illustratively assumed .7 p. s. i., in the brake pipe passage 25 and hence in the chamber 45, the quick service valve device 9 will respond for locally releasing fluid under pressure from said passage 25, via chamber 45, cavity 57 and passage 59 to the quick service volume 61, so as to effect a quick service reduction in the brake pipe 1; it being noted that said volume will then be open to atmosphere by way of a vent communication defined by another branch of the passage 59, the cavity 90 of the inshot valve device 10, the quick service reduction choke 92, passage 29, brake cylinder application choke 30, and the brake cylinder device 5, which, in turn, is open to atmosphere via the passage 80, the chamber 79 of said inshot valve device, the passage 37, cavity 36 of the service valve device 8 and the brake cylinder release choke 38. As the quick service volume 61 thus becomes charged, fluid will continue to be released from brake pipe passage 25 by way of this vent communication, at the rate controlled by the choke 38, until brake pipe pressure in said passage 25 and hence in chamber 23 of said service valve device is reduced to a degree sufficient to cause the slide valve 18 of the latter device to be shifted to application position for effecting supply of fluid under pressure from the auxiliary reservoir 4 to the brake cylinder device 5 by way of passage 39, slide valve cavity 36 and passage 37, as previously explained.

Meanwhile, flow of fluid under pressure from the brake pipe passage 25 to the quick service volume 61 and to the vented brake cylinder device 5 via the quick service reduction choke 92, in the manner just described, will effect a further reduction in pressure in chamber 45 of the quick service valve device 9, thereby causing further deflection of the diaphragm 40 for shifting the slide valve 43 the remaining distance to its previously defined quick service position for unseating the check valve 53 through the medium of the stem 47 and thus permitting fluid under pressure to flow via the chambers 54, 50 and the passage 51 to the timing volume 52 and thence via cavity 87 of the inshot valve device 10 to passage 88, whence it will flow to the pressure chamber 61a of the charging valve device 11 for causing operation of the latter device to cut off fluid pressure communication of the brake pipe 1 with the control reservoir 3 and auxiliary reservoir 4, as previously explained.

It will thus be noted that if the apparatus, as thus far described and heretofore proposed, is used in a train having a relatively low percentage of brake-equipped cars, the respective quick service valve devices 9 (which must effect a quick service reduction in a total volume of the brake pipe corresponding to that between adjacent brake-equipped cars and thus including the "dead" brake pipe volume on all intervening unbraked cars) may be unable, due to the fixed, compromise flow capacity of the quick service reduction choke 92 and the fixed, compromise size of the quick service volume 61, to effect a quick service reduction in the brake pipe and hence in chamber 45 at a rate faster than that at which opposing auxiliary reservoir pressure in chamber 46 is being depleted as a result of flow of fluid under pressure from the auxiliary reservoir 4 to the timing volume 52 and charging valve device 11 via the unseated check valve 53, as well as to the brake cylinder device 5 via the service valve device 8 and the inshot valve device 10, in the manner previously described. If the quick service reduction in the brake pipe fails to exceed the rate of depletion of auxiliary reservoir pressure, the diaphragm 40 of the quick service valve device 9 will be deflected, by action of spring 58 and the preponderant pressure in chamber 45, and cause the slide valve 43 to be shifted from quick service position back toward or to normal position, thus permitting closure of the check valve 53 under action of the spring 55, with the result that supply of fluid under pressure to the timing volume 52 and chamber 61a of the charging valve device 11 will be cut off. Hence, if such closure should occur before fluid pressure in the timing volume 52, passage 88 and chamber 61a has attained a value sufficient to cause the slide valve 99 of the charging valve device 11 to be shifted to cut-off position, both control reservoir pressure and auxiliary reservoir pressure will tend to equalize with reduced brake pipe pressure; and, under such condition, the consequent reduction in control reservoir pressure in chamber 21 of the service valve device 8 will so modify operation of the latter device as to prevent the development in the brake cylinder device 5 of a pressure which is directly proportionate to the chosen degree of brake pipe reduction.

It is therefore desirable that where, as in Europe, the percentage of brake-equipped cars in a train is varied to suit particular conditions of load, terrain, intended speed, etc., an improved brake apparatus be provided which embodies means for insuring that the slide valve 99 of the charging valve device 11 will be moved to cut-off position promptly after initiation of a brake application and even if only a small percentage of the cars in a train are equipped with brake apparatus.

To this end and according to the invention, the brake controlling valve device 2 comprises a volume 107 which is adapted to be charged with fluid under pressure from a source, preferably the auxiliary reservoir 4, at a restricted rate as controlled by a choke 108 that is interposed between a branch of the auxiliary reservoir passage 39 and said volume.

The volume 107 is constantly open by way of a passage 109 to the chamber 54 of the quick service valve device 9, and is of such capacity as to be able, upon previously described unseating of the check valve 53, to supply the fluid under pressure necessary to charge the timing volume 52 and also the pressure chamber 61a of the charging valve device 11 for causing operation of the latter device to cut off the control reservoir 3 and auxiliary reservoir 4 from the brake pipe 1, in the manner already explained. The choke 108 is preferably of such flow capacity as to restrict the charging rate of the volume 107 only sufficiently to prevent a drain on the auxiliary reservoir 4 while the timing volume 52 and chamber 61a are being charged via unseated check valve 53; the pressure in said auxiliary reservoir being maintained at the proper value in relation to brake pipe pressure, despite such restricted charging, by compensatory flow either by way of the charging valve device 11 (as when brakes are released) or the service valve device 8 (as during a brake application), which latter device controls an auxiliary reservoir charging communication (not shown) that is fully shown and described in the second described copending application of E. S. Cook and is not pertinent to the present invention.

Summary

It will now be seen that the improved apparatus comprises a volume 107 which is adapted to be charged at a restricted rate with fluid under pressure from a source, such as the auxiliary reservoir 4, primarily while the quick service slide valve 43 is in normal position; and then upon movement of said slide valve to quick service position and consequent unseating of the check valve 53, said volume is adapted to provide the fluid under pressure necessary to charge the timing volume 52 and the pressure chamber 61a of the charging valve device 11 without imposing a drain on said source.

It will also be seen that the improved brake apparatus embodies means for insuring that the quick service valve device 9 will positively move to, and remain in, quick service position for a period of time sufficient to assure previously described operation of the charging valve device 11 to cut-off position even if such apparatus is employed in a train comprising a low percentage of brake-equipped cars.

Having now described the invention, what I claim as new and desire to secure by Letters Patent, is:

1. In a fluid pressure brake apparatus, the combination of a brake pipe, a control reservoir, a local volume chargeable with fluid under pressure from a source thereof, means for restricting the rate of such charging, first valve means controlled by pressure of fluid in said brake pipe and an opposing pressure and responsive to a reduction in brake pipe pressure relative to said opposing pressure to open said volume to a first fluid pressure communication, a second fluid pressure communication through which fluid under pressure from said brake pipe may flow to said control reservoir, second valve means responsive to release of fluid under pressure from a chamber to open said second communication and operative upon supply of fluid under pressure to said chamber to close said second communication, a brake cylinder device, third valve means operative to supply fluid under pressure or release fluid under pressure from said brake cylinder device according to whether pressure of fluid in said brake pipe is reduced or increased relative to pressure of fluid in said control reservoir, and fourth valve means controlled by pressure of fluid in said brake cylinder device and operative to open said first communication to said chamber when brake cylinder pressure is below a chosen value and to close said first communication to said chamber upon an increase in brake cylinder pressure above said chosen value.

2. In a fluid pressure brake apparatus, the combination of a brake pipe, a local volume chargeable with fluid under pressure from a source thereof, means for restricting the rate of such charging, a control reservoir, a certain fluid pressure communication via which fluid under pressure from said brake pipe may flow to said control reservoir, first valve means responsive to release of fluid under pressure from a chamber to open said certain communication and responsive to pressure of fluid in said chamber to close said certain communication, second valve means controlled by pressure of fluid in said brake pipe and an opposing pressure and operative upon a reduction in brake pipe pressure relative to said opposing pressure to open said volume to another fluid pressure communication, a brake cylinder device, third valve means controlled by pressure of fluid in said brake cylinder device and operative to open or close said other communication to said chamber according to whether brake cylinder pressure is below or is increased above a certain value, respectively, a restricted communication constantly connecting said chamber and brake cylinder device, and fourth valve means controlled by variation in pressure of fluid in said brake pipe relative to that in said control reservoir and responsive to a reduction in brake pipe pressure to supply fluid under pressure to said brake cylinder device and operative upon a subsequent increase in brake pipe pressure to release fluid under pressure from said brake cylinder device.

3. In a fluid pressure brake apparatus, the combination of a brake pipe, an auxiliary reservoir, a local volume chargeable with fluid under pressure from said auxiliary reservoir, means for restricting the rate of such charging, first valve means controlled by opposing pressures of fluid in said brake pipe and auxiliary reservoir and operative in response to a reduction in brake pipe pressure below auxiliary reservoir pressure to open said volume to a first fluid pressure communication, second valve means responsive to release of fluid under pressure from a chamber to establish another fluid pressure communication for effecting charging of said auxiliary reservoir with fluid under pressure from said brake pipe and operative by pressure of fluid in said chamber to disestablish said other communication, a brake cylinder device, and third valve means responsive to a reduction in fluid pressure in said brake pipe relative to an opposing pressure to supply fluid under pressure from said auxiliary reservoir to said brake cylinder device and responsive to an increase in brake pipe pressure relative to said opposing pressure to release fluid under pressure from said brake cylinder device, and fourth valve means controlled by pressure of fluid in said brake cylinder device and operative to open said first communication to said chamber except when brake cylinder pressure is increased above a chosen value.

4. A fluid pressure brake apparatus comprising a brake pipe, an auxiliary reservoir, a control reservoir, a brake cylinder device, a local volume for storing fluid under pressure, means for restricting the rate of charging of said volume with fluid under pressure, first valve means having a normal position and movable from said normal position in response to a reduction in brake pipe pressure relative to auxiliary reservoir pressure for successively effecting a further, local reduction in brake pipe pressure and then, in response to said further reduction, connecting said volume to a first fluid pressure communication, second valve means controlled by pressure of fluid in a chamber for controlling one communication between said brake pipe and auxiliary reservoir and another communication between said brake pipe and control reservoir and operative to open said one communication and other communication except when pressure in said chamber exceeds a predetermined low value, third valve means subject to constant pressure of fluid in said control reservoir and, in opposition to such pressure, to pressure in said brake pipe and in said brake cylinder device and operative in response to a reduction in brake pipe pressure relative to said constant pressure to supply fluid under pressure from said auxiliary reservoir to said brake cylinder device, and fourth valve means controlled by brake cylinder pressure and operative to open said first communication to said chamber when brake cylinder pressure is below a predetermined higher value and to close said first communication upon an increase in brake cylinder pressure above said higher value.

5. In a fluid pressure brake apparatus, the combination of a brake pipe, an auxiliary reservoir, a control reservoir, a service valve device responsive to a reduction in brake pipe pressure below control reservoir pressure to cause a brake application of a substantially corresponding degree and responsive to a restoration of brake pipe pressure toward the value of control reservoir pressure to cause a brake release of a corresponding degree, a local volume normally charged with fluid under pressure from said auxiliary reservoir, choke means for restricting the rate of charging of said volume, a quick service valve device controlled by opposing fluid pressures in said brake pipe and auxiliary reservoir and operative in response to a reduction in brake pipe pressure relative to auxiliary reservoir pressure to connect said local volume to a normally vented chamber, a charging valve device controlled by pressure of fluid in said chamber and normally operative to open said brake pipe to said auxiliary reservoir and said control reservoir and operative to close such connection when pressure in said chamber exceeds a chosen value.

6. In a fluid pressure brake apparatus, the combination of a brake pipe, an auxiliary reservoir, a local volume chargeable with fluid under pressure from said auxiliary reservoir, choke means for restricting the rate of such charging, a timing volume for storing a metered quantity of fluid under pressure, a check valve for normally preventing flow of fluid between said local volume and timing volume, a charging valve device having a chamber and operative when said chamber is substantially devoid of fluid under pressure to open certain fluid pressure communications and responsive to pressure of fluid in said chamber to close said certain communications, a quick service valve device responsive to a reduction in fluid pressure in said brake pipe relative to fluid pressure in said auxiliary reservoir to connect said brake pipe to a quick service communication for effecting a further reduction in brake pipe pressure and open said check valve for connecting said local volume to said timing volume, a brake cylinder communication to which fluid under pressure is adapted to be supplied for applying brakes and from which fluid under pressure is adapted to be released for releasing brakes, an inshot valve device adapted to assume one position when pressure in said brake cylinder communication is below a certain value for opening said quick service communication and opening said timing volume to said chamber and responsive to an increase in pressure in said brake cylinder communication to close said quick service communication and close said timing volume from said chamber, and a restricted passageway connecting said chamber and brake cylinder communication.

7. In a fluid pressure brake apparatus, the combination of a brake pipe, an auxiliary reservoir, a local volume chargeable with fluid under pressure from said auxiliary reservoir, choke means for restricting the rate of such charging, a timing volume for storing a metered quantity of fluid under pressure, a check valve for normally preventing flow of fluid between said local volume and timing volume, a control reservoir, a first charging communication connecting said brake pipe and control reservoir, a second charging communication connecting said brake pipe and auxiliary reservoir, a charging valve device having a chamber and responsive to release of fluid under pressure from said chamber to open said first and second charging communications and responsive to supply of fluid under pressure to said chamber to close said first and second charging communications, a quick service valve device responsive to a reduction in pressure in said brake pipe relative to pressure in said auxiliary reservoir to connect said brake pipe to a quick service communication for effecting a further reduction in brake pipe pressure and open said check valve for connecting said local volume to said timing volume, a brake cylinder communication to which fluid under pressure is adapted to be supplied for applying brakes and from which fluid under pressure is adapted to be released for releasing brakes, and an inshot valve device adapted to open said quick service communication and also open said timing volume to said chamber except when pressure in said brake cylinder communication is increased above a certain value.

References Cited in the file of this patent

FOREIGN PATENTS

| | | |
|---|---|---|
| 668,122 | Great Britain | Mar. 2, 1952 |
| 702,100 | Great Britain | Jan. 6, 1954 |